United States Patent [19]

Ross et al.

[11] Patent Number: 4,852,717

[45] Date of Patent: Aug. 1, 1989

[54] COMPUTER CONTROLLED LIGHT CONTACT FEEDER

[75] Inventors: Jeffrey L. Ross, Pulaski; James W. Krueger, Green Bay, both of Wis.

[73] Assignee: FMC Corporation, Chicago, Ill.

[21] Appl. No.: 929,457

[22] Filed: Nov. 12, 1986

[51] Int. Cl.⁴ .............................................. B65G 47/31
[52] U.S. Cl. ................................... 198/462; 198/460; 198/575; 198/464.2
[58] Field of Search ..................... 198/464.3, 572, 460, 198/575, 576, 502.3, 461, 464.2, 462

[56] References Cited

U.S. PATENT DOCUMENTS

| | | | |
|---|---|---|---|
| 3,212,622 | 12/1963 | Metz | 198/460 |
| 3,452,856 | 7/1969 | Brittain | 198/464.3 |
| 3,459,289 | 8/1969 | Roseman | 198/464.3 |
| 3,817,368 | 6/1974 | Wentz et al. | 198/572 |
| 3,944,049 | 3/1976 | Graybill | 198/460 |
| 4,073,375 | 2/1978 | Hart et al. | 198/464.3 |
| 4,197,935 | 4/1980 | Aterianus et al. | 198/460 |
| 4,360,098 | 11/1982 | Nordstrom | 198/460 X |
| 4,604,704 | 8/1986 | Eaves et al. | 198/575 X |
| 4,640,408 | 2/1987 | Eaves | 198/460 |
| 4,690,269 | 9/1987 | Takao | 198/460 |
| 4,717,013 | 1/1988 | Reissmann et al. | 198/460 X |
| 4,724,946 | 2/1988 | Cinotti | 198/460 X |

FOREIGN PATENT DOCUMENTS

| | | |
|---|---|---|
| 2346407 | 3/1974 | Fed. Rep. of Germany ... 198/460 X |
| 2708762 | 9/1977 | Fed. Rep. of Germany ... 198/460 X |

Primary Examiner—Robert J. Spar
Assistant Examiner—Lyle K. Kimms
Attorney, Agent, or Firm—Douglas W. Rudy; Richard B. Megley

[57] ABSTRACT

A light contact feeder uses a pair of individually controlled conveyor belts to receive randomly spaced articles and to deliver the articles in a lightly abutted arrangement. The feeder uses a trio of accumulator scanners above an accumulator belt to control belt speed and deliver lightly abutted articles to a metering belt. The metering belt delivers the articles at proper speed and phase to an article processing machine.

12 Claims, 16 Drawing Sheets

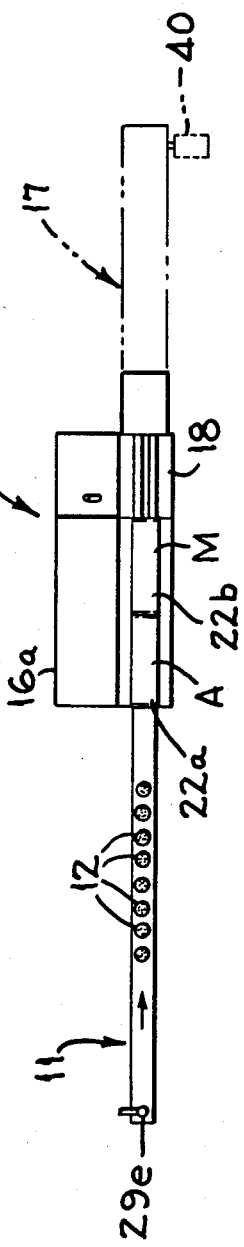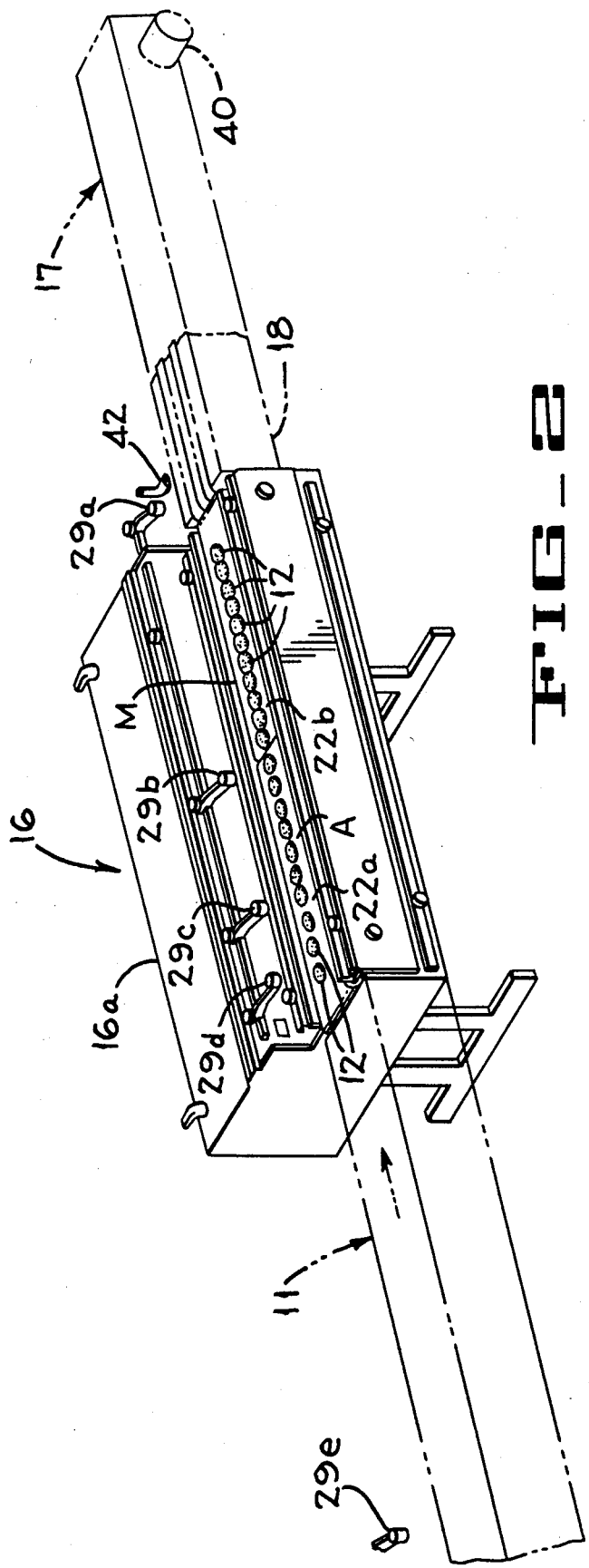

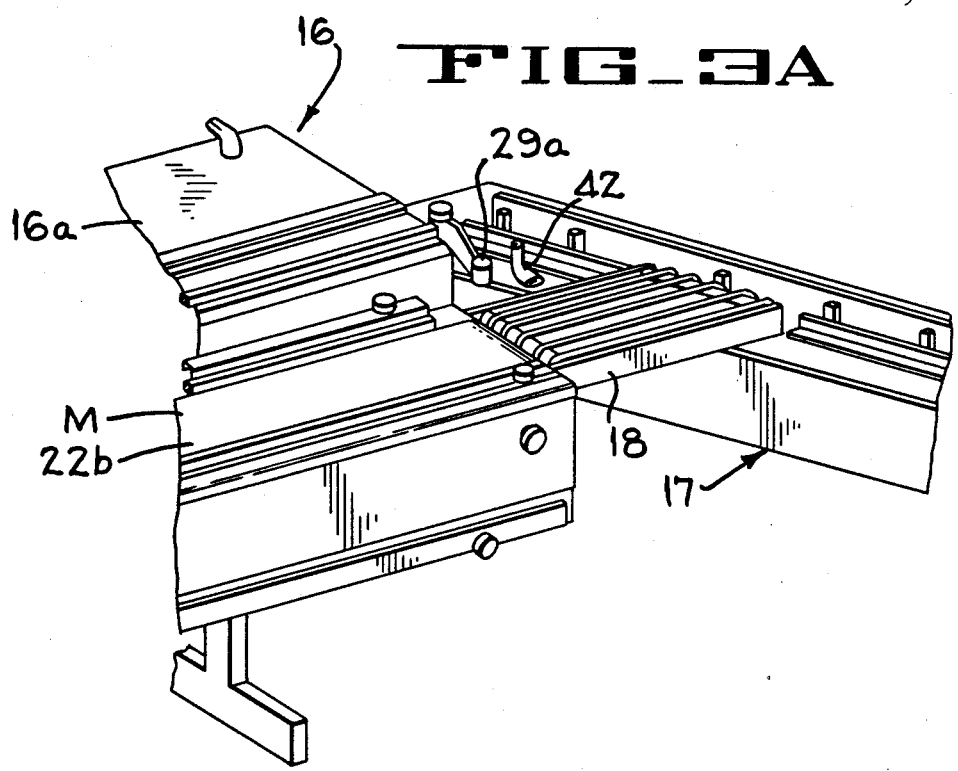
FIG_3A
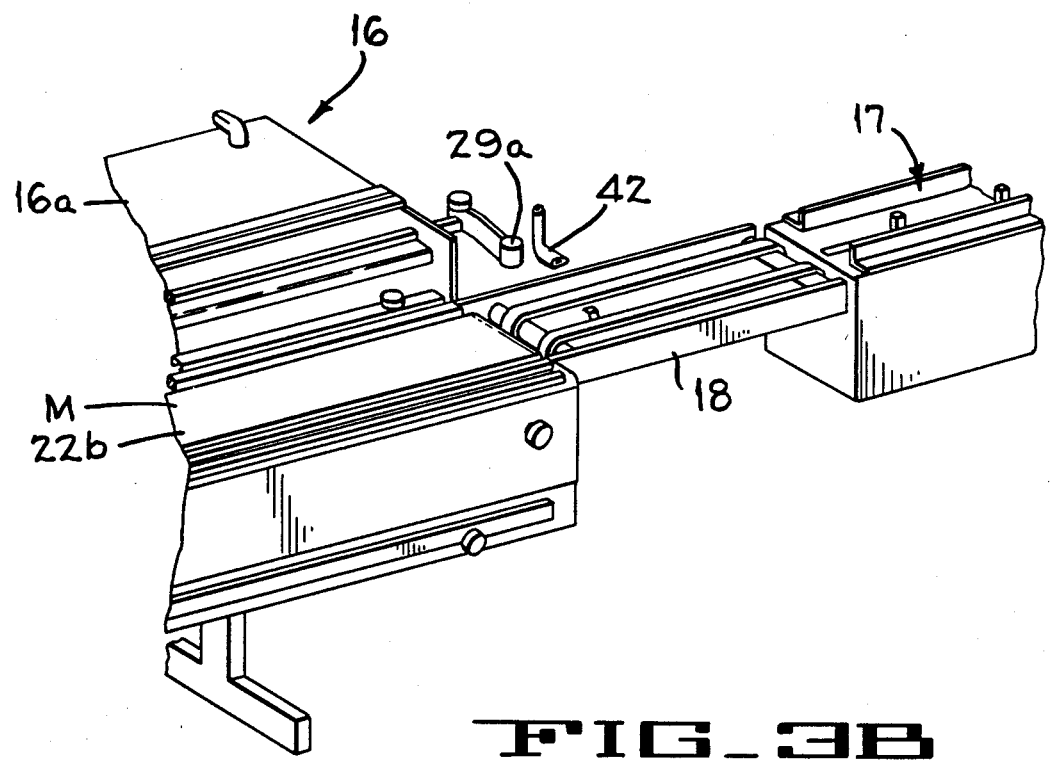
FIG_3B

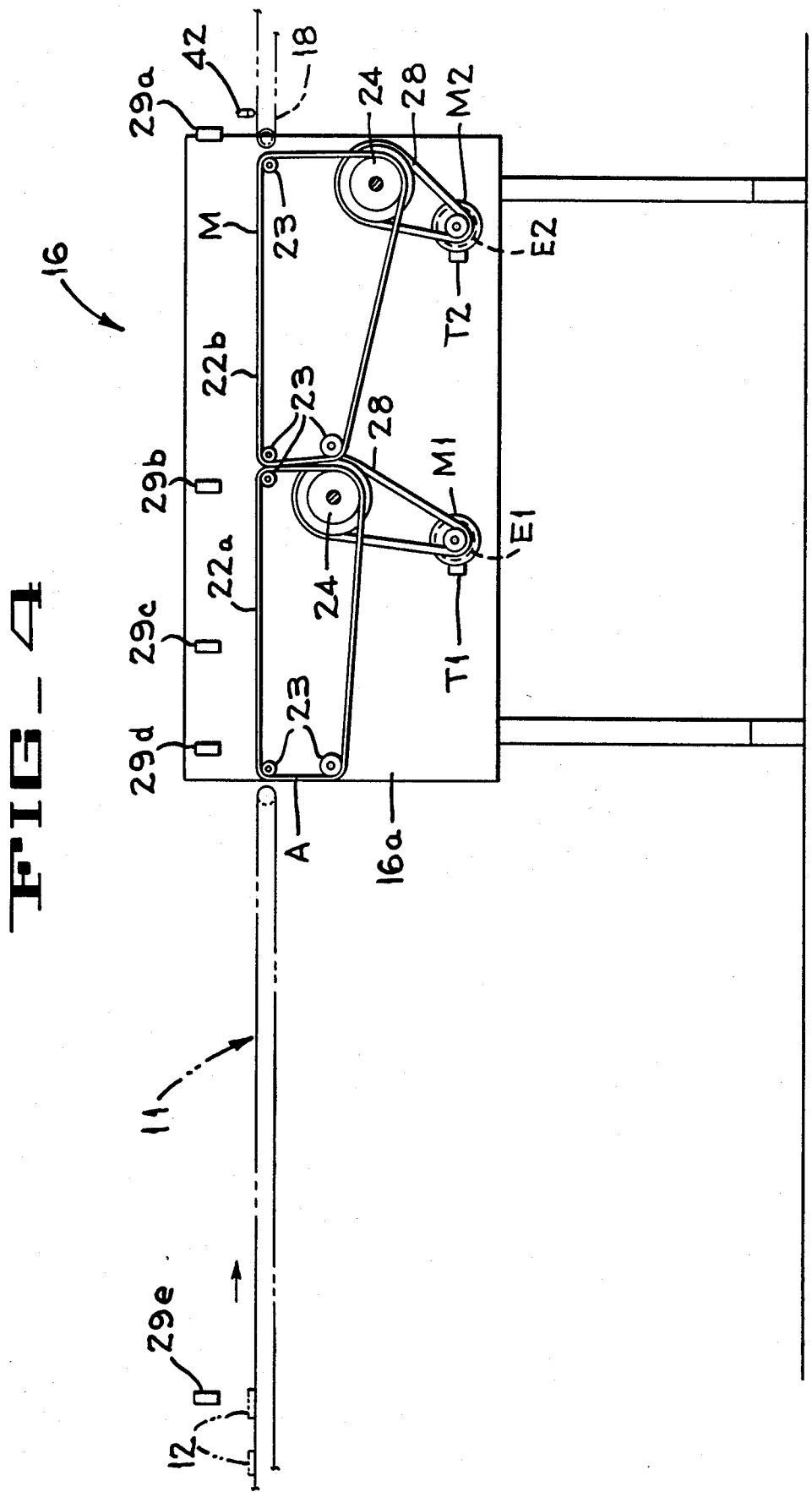

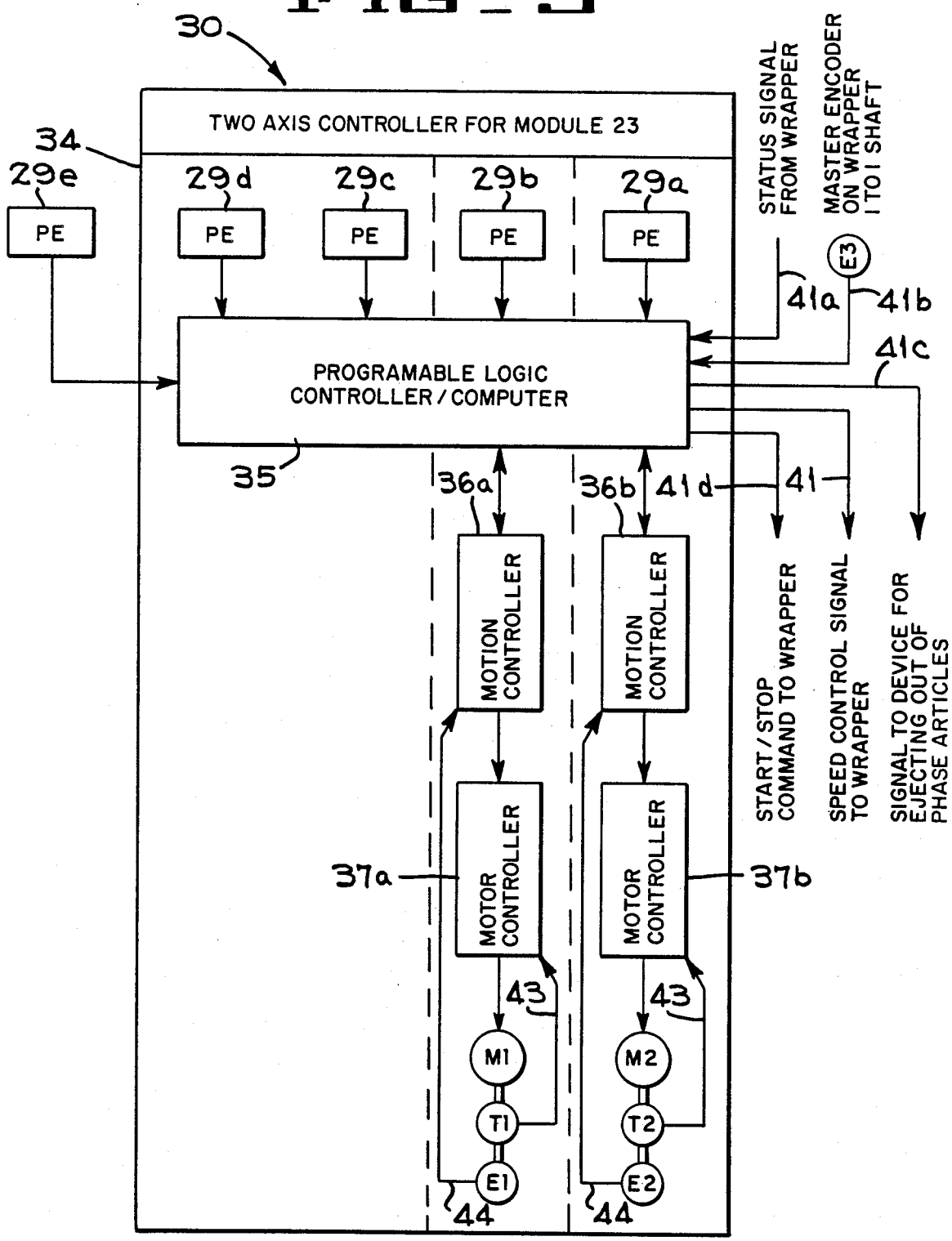

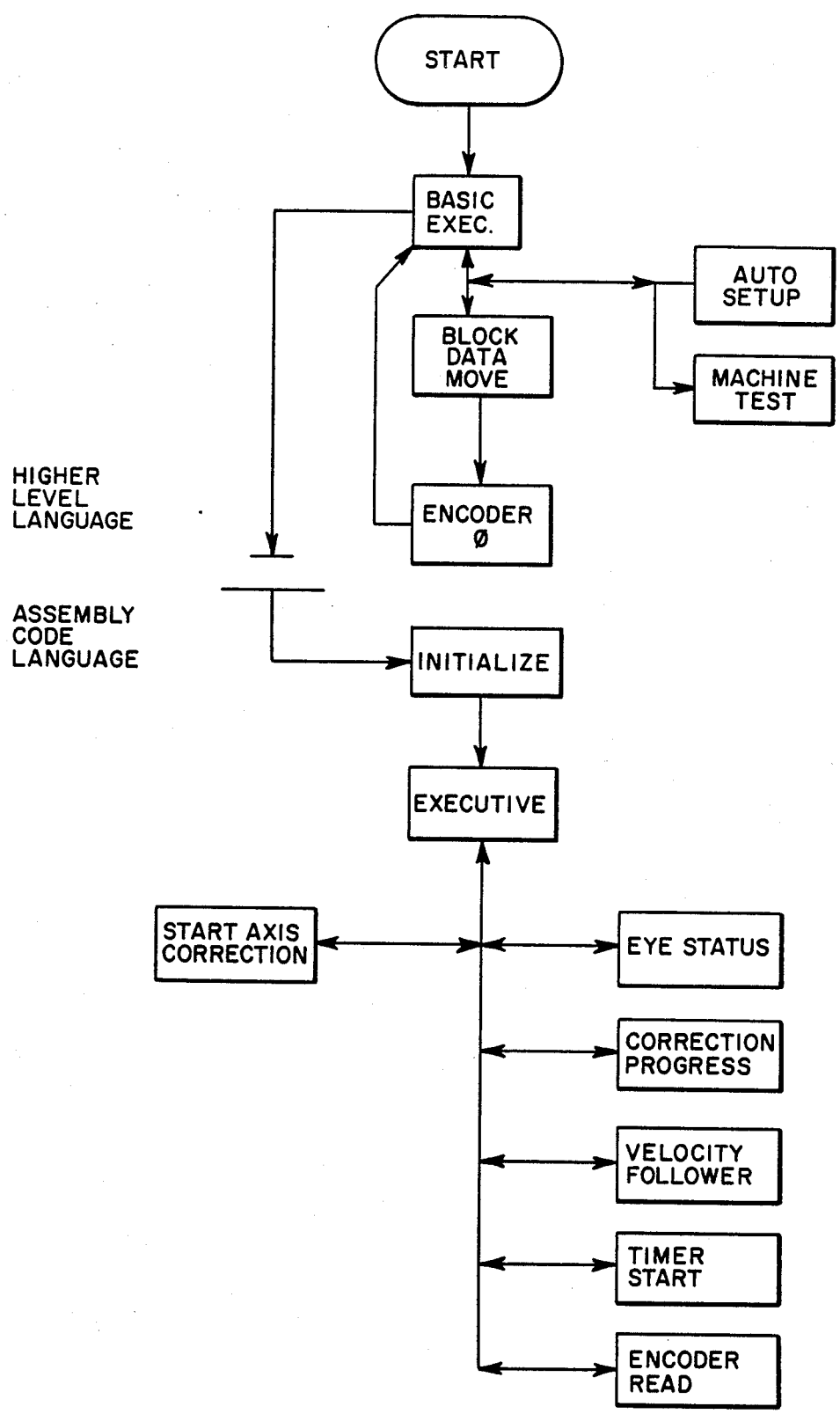
FIG_6

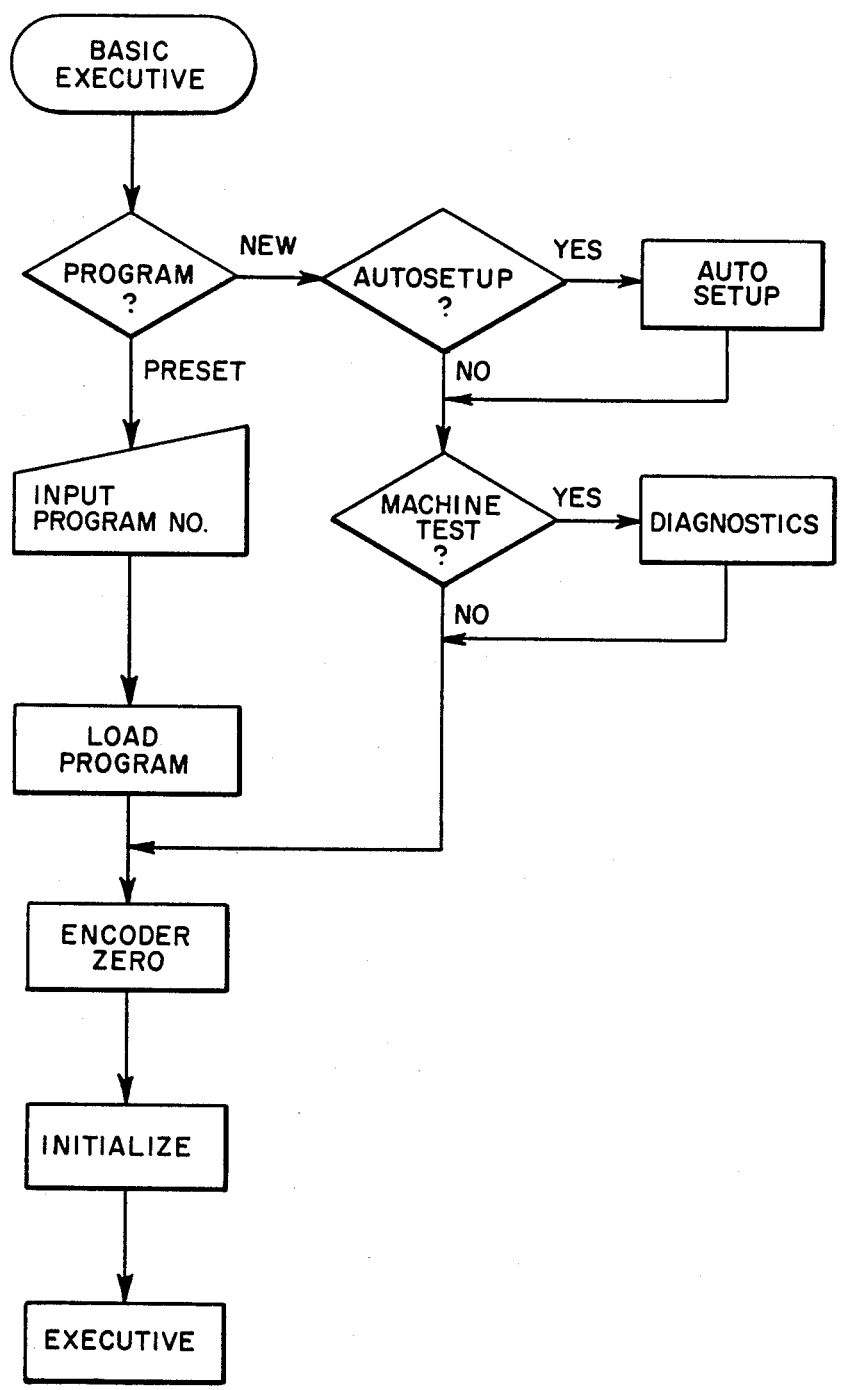
FIG_7

FIG_8
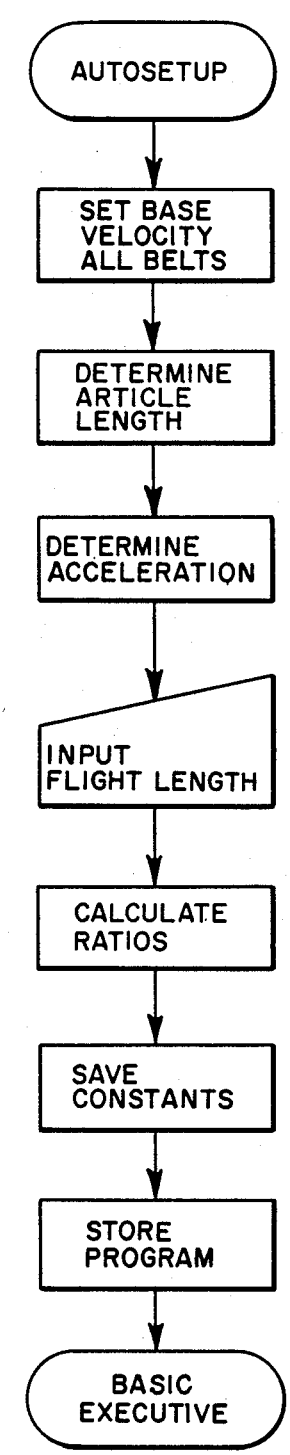
FIG_9
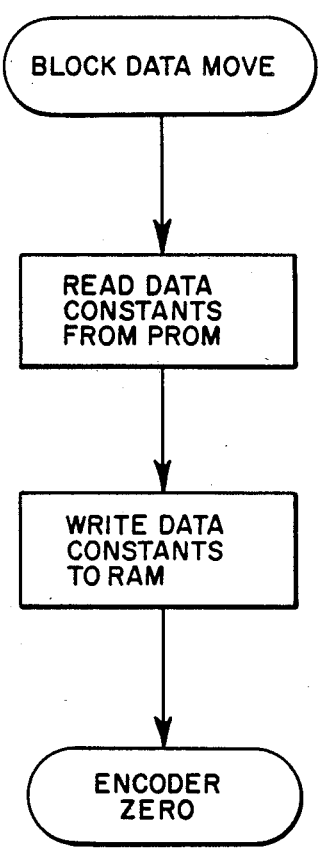

FIG_10
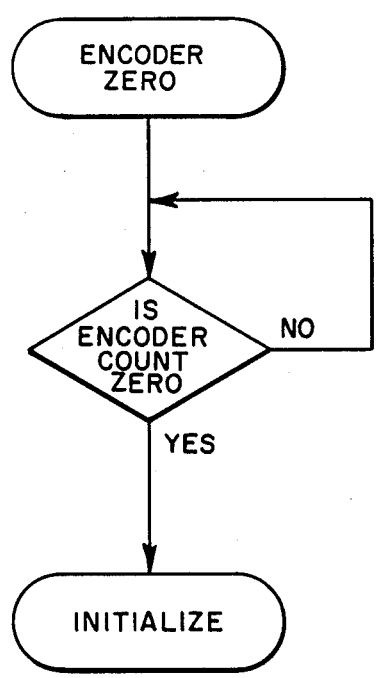
FIG_11
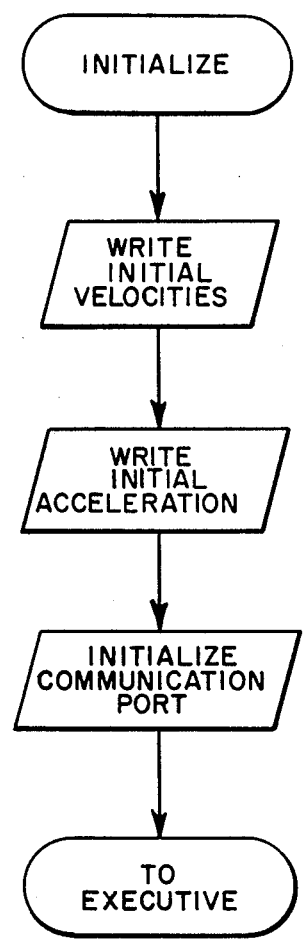

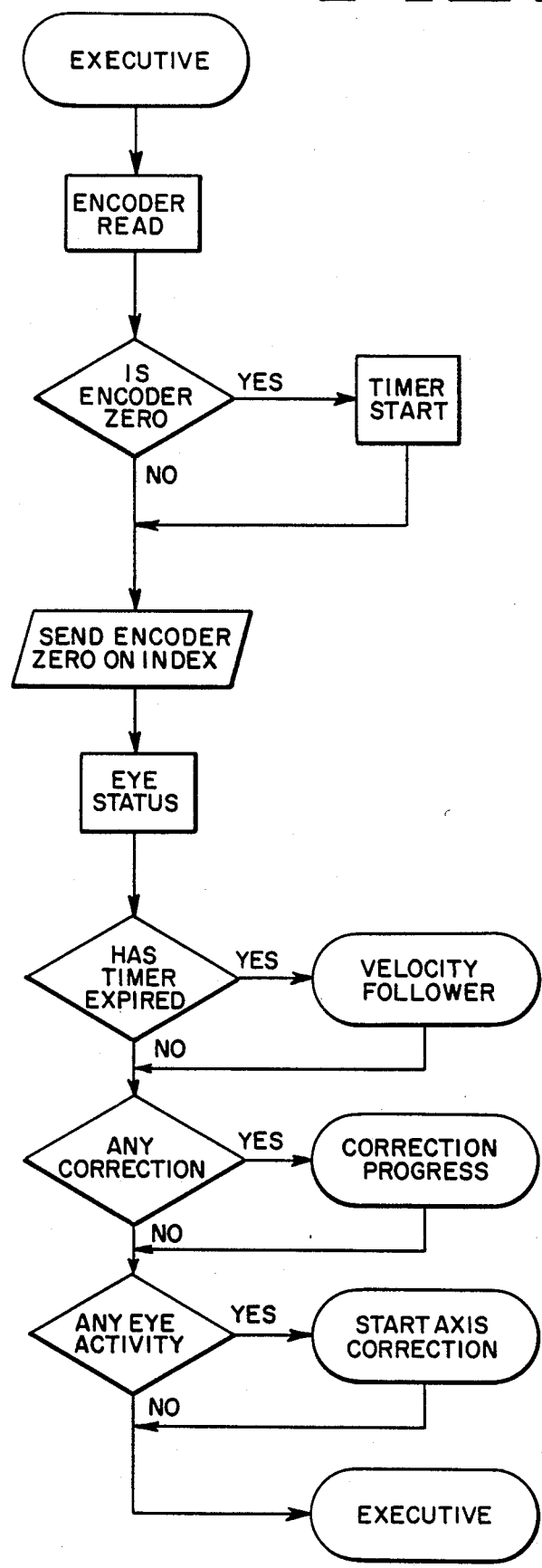
FIG_12

FIG_13
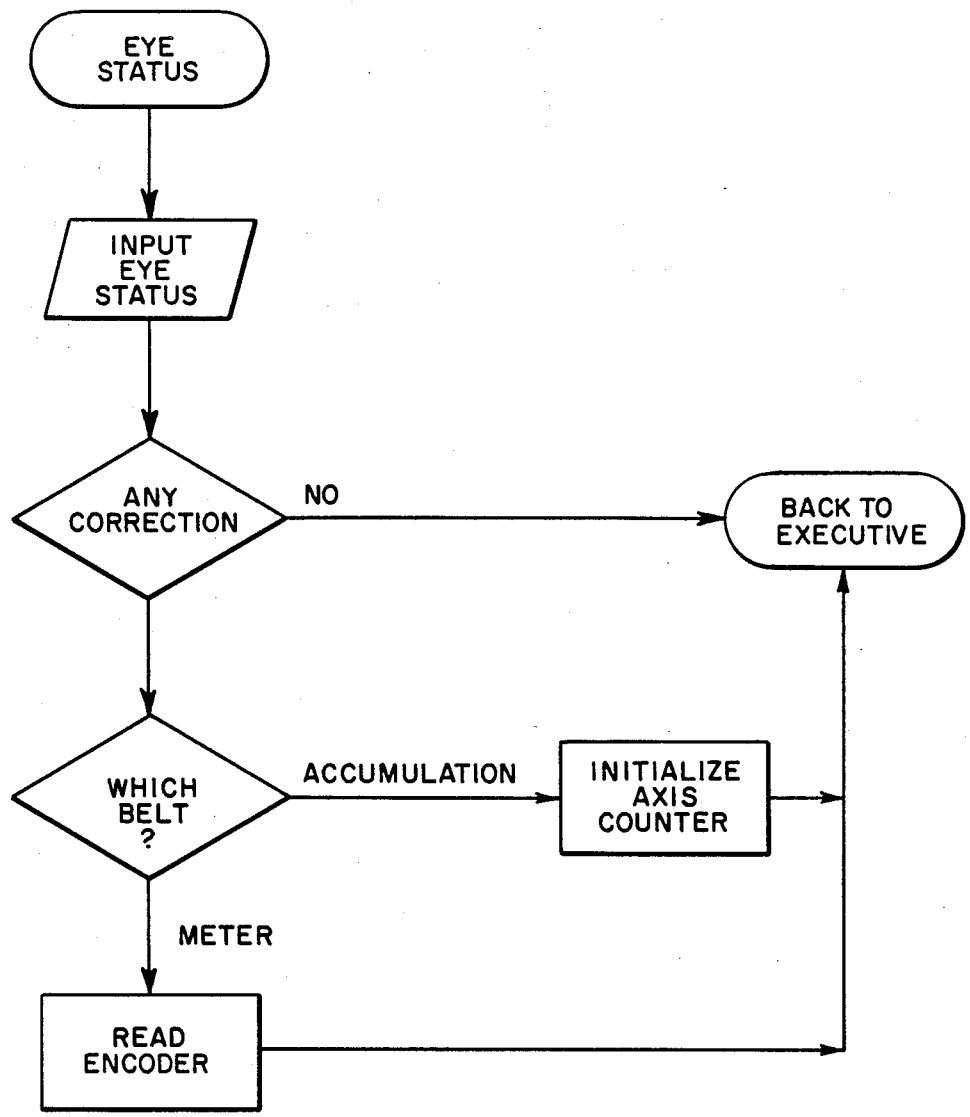

FIG_14
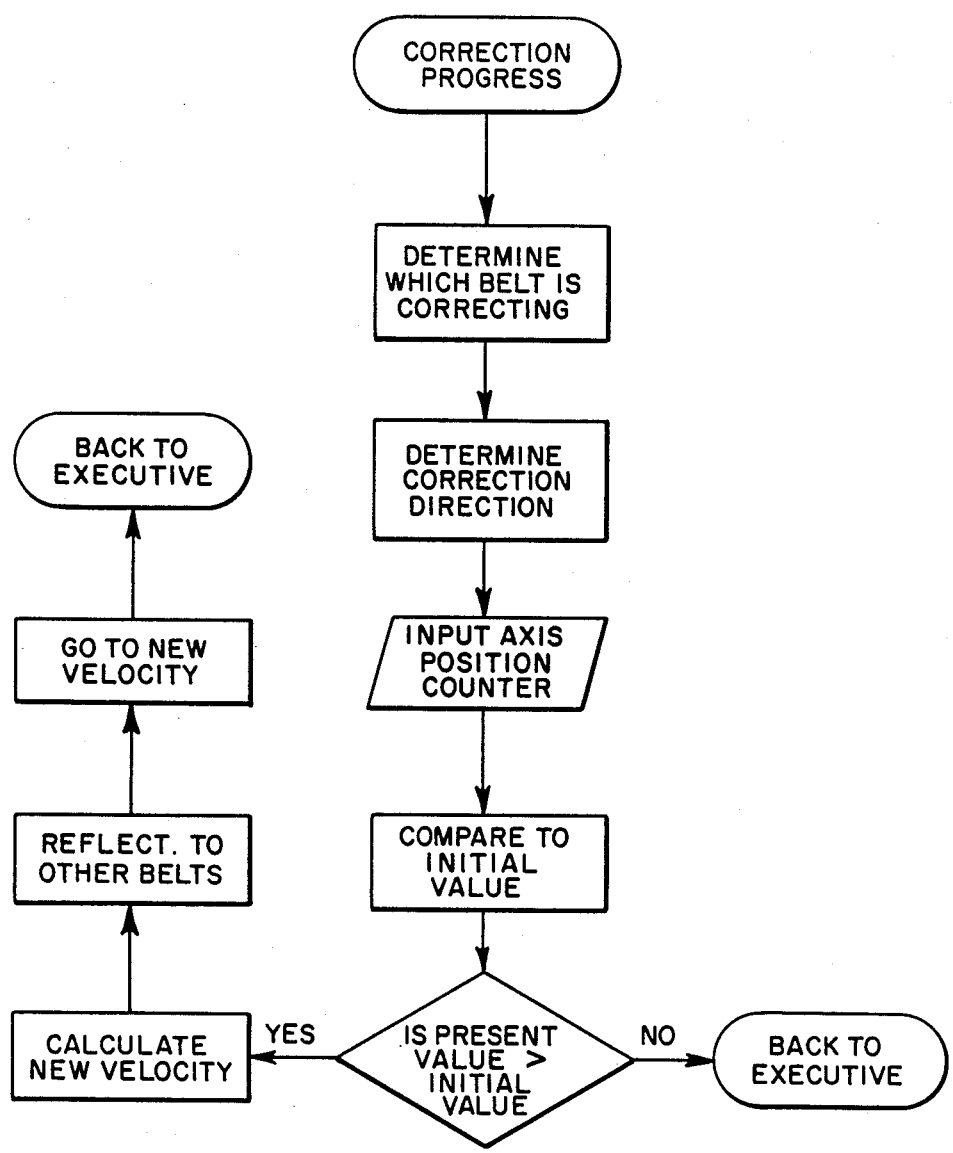

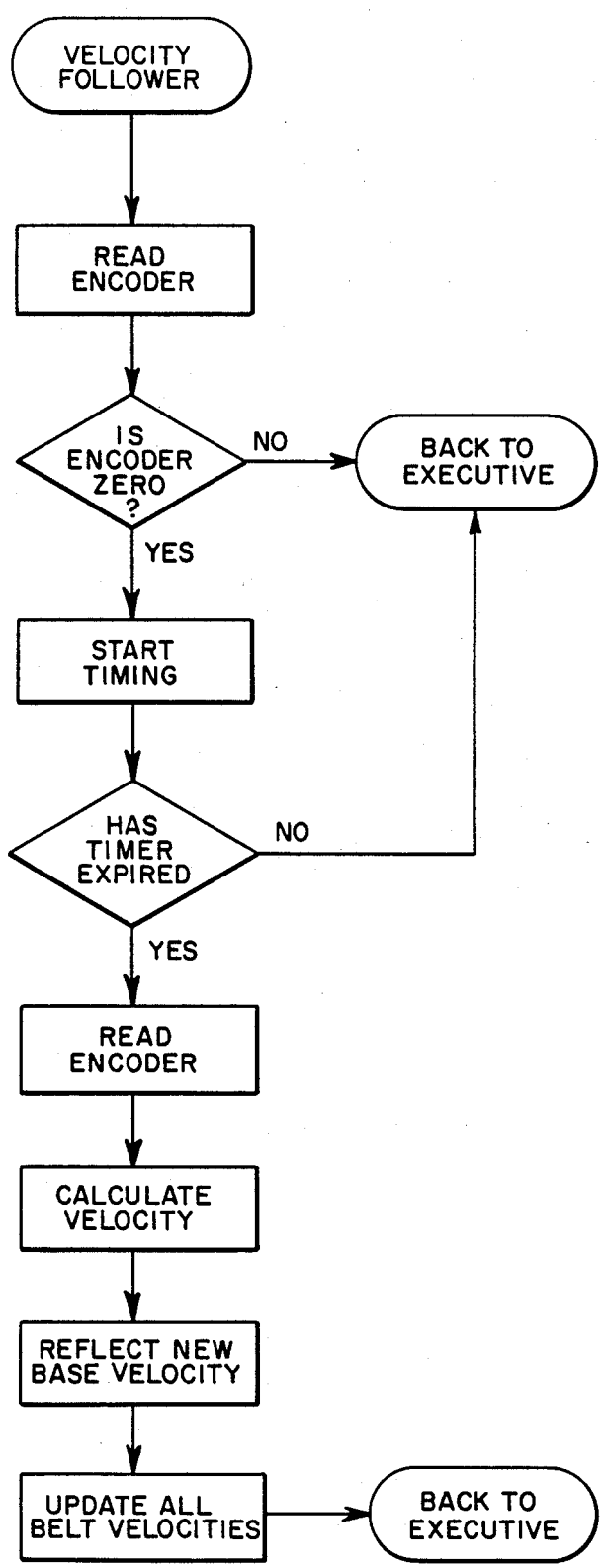
FIG_15
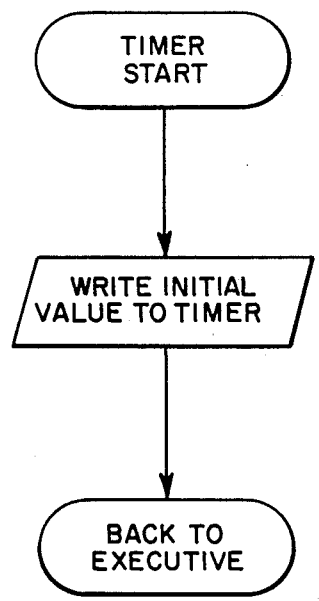
FIG_16

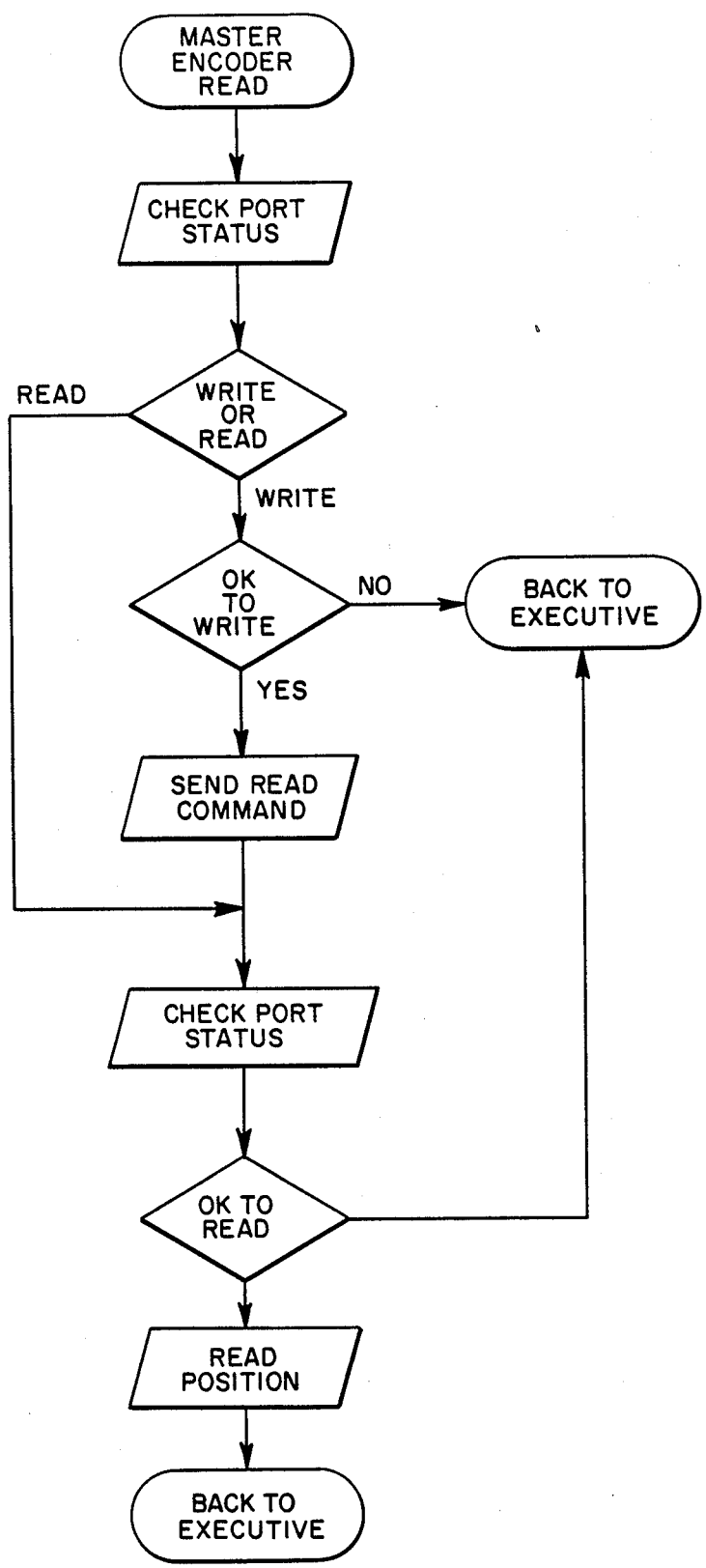
FIG_17

FIG_18
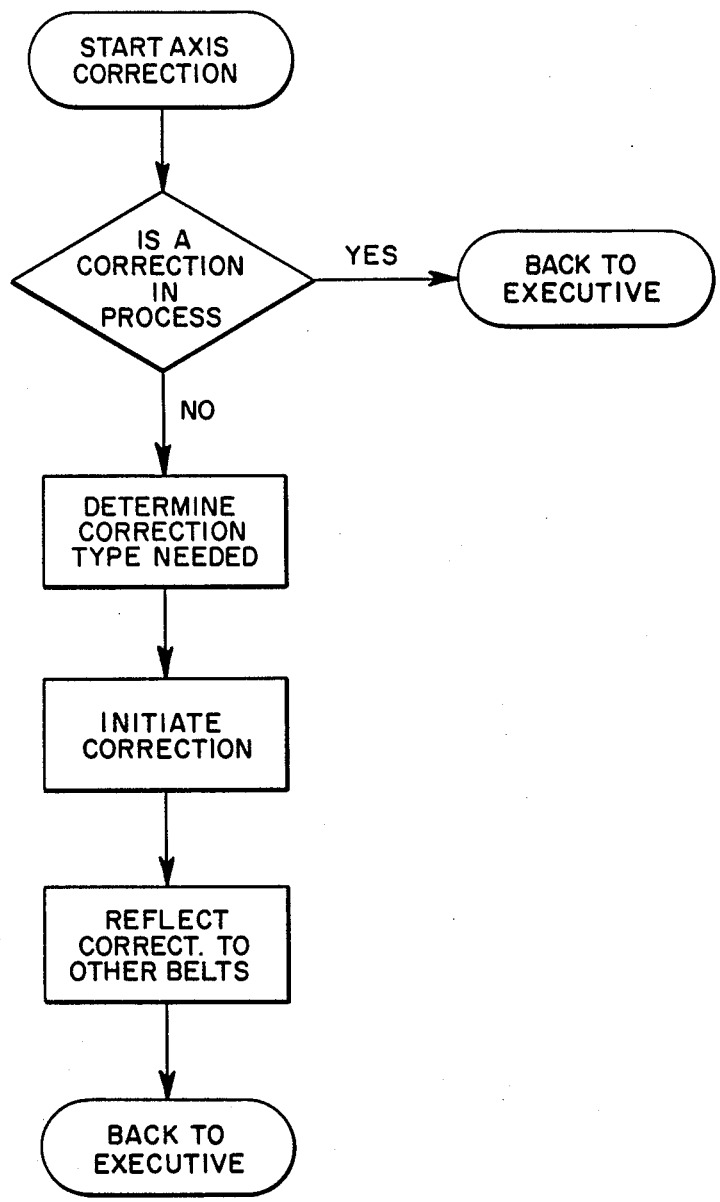

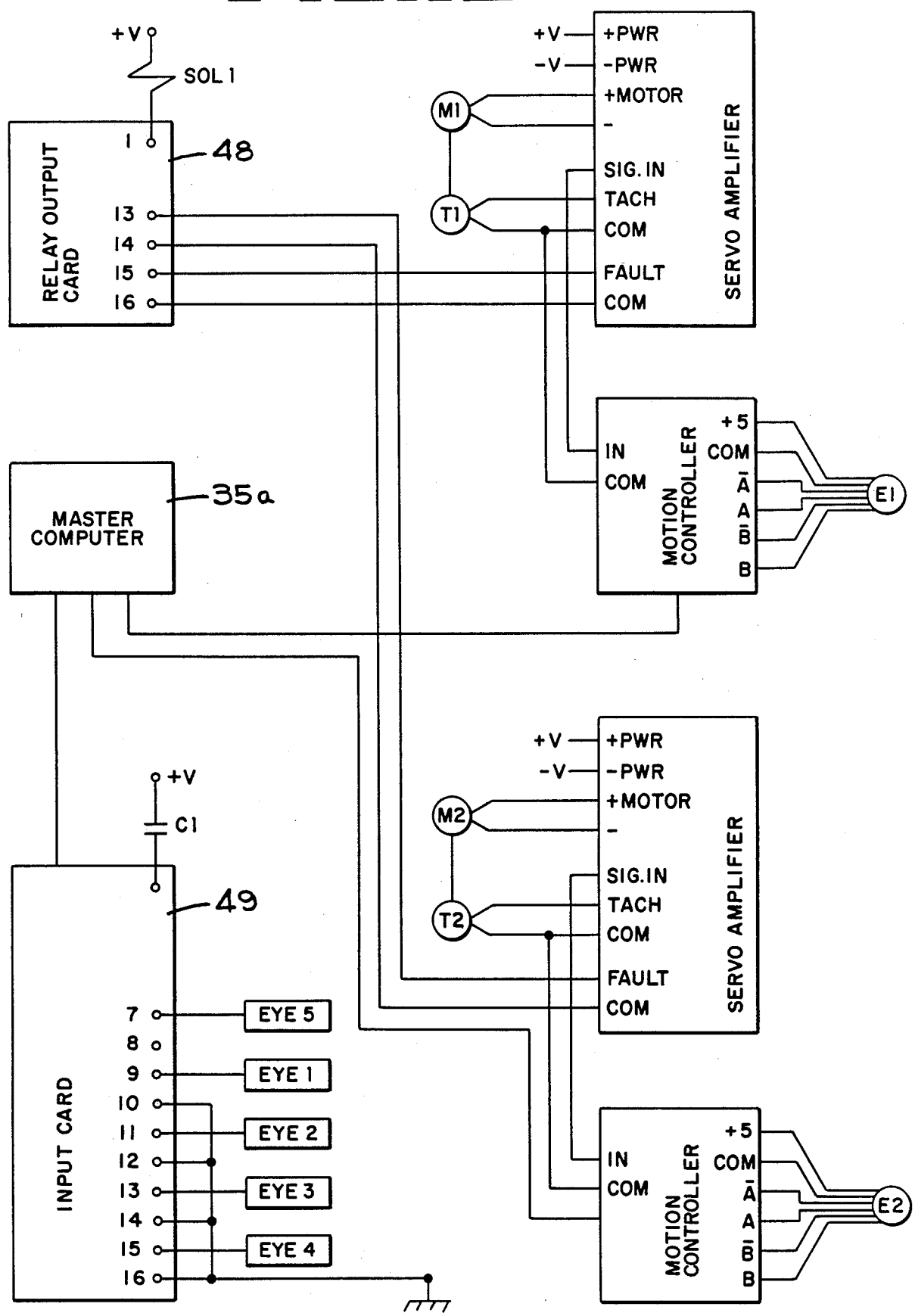

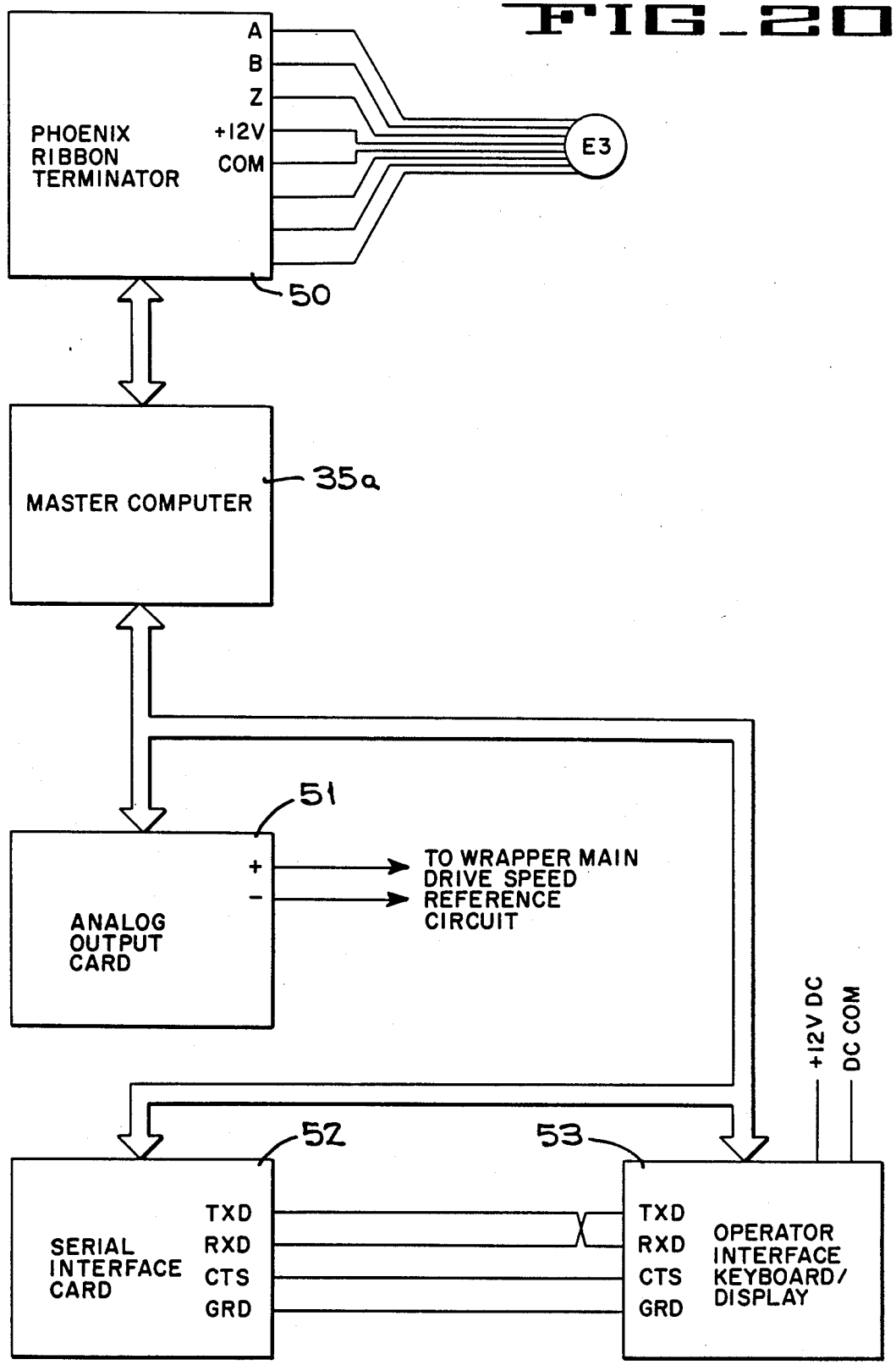

COMPUTER CONTROLLED LIGHT CONTACT FEEDER

BACKGROUND OF THE INVENTION

The present invention relates to apparatus for automatically feeding articles into an article processing machine, and more particularly, to apparatus for continuously correcting the positions of randomly spaced articles and transferring the articles with proper timing into the preceding conveyor of a horizontal wrapping machine.

Horizontal wrapping machines commonly use conveyors to feed a series of longitudinally spaced articles to a wrapping portion where one or more of the articles are placed into each wrapped package. Such wrapping machines conventionally are used with a feeder which receives abutted articles from a supply conveyor and separates these articles into a predetermined spaced and timed relation relative to the wrapping machine receiver conveyor. The feeder usually includes an article accumulation conveyor which operates at a high speed so that a back log of articles from the supplier conveyor are accumulated at the feeding station. Such a feeder may not work satisfactorily with delicate articles which may be damaged due to excessive pressure between the abutted articles.

SUMMARY OF THE INVENTION

The present invention provides a light contact feeder which takes randomly spaced articles and places these articles in lightly abutted spacing and timing for transfer to a receiving conveyor of a wrapping machine. The present invention includes a pair of flat belt conveyor which are individually driven by servo motors. These motors are automatically controlled to close gaps between articles and to provide article timing relative to the receiving conveyor of a wrapping machine. The speed of each individual article can be periodically regulated to lightly abut the adjacent articles, and the speed of the individual article can be periodically adjusted to properly time the article relative to the receiving conveyor of the wrapping or other article processing machine.

Since the articles are lightly abutted, even delicate articles, or articles which have irregular shapes can be fed in proper phase to the wrapper by the present invention. The control system can be adapted to feed articles of different lengths. The control system can monitor the rate of incoming articles and control the feeder and wrapping machine speed to maintain a backlog of spaced apart articles within preset limits, and can start and stop automatically in response to the starting and stopping of article supply. Articles which may be randomly supplied in spaced relationship with one another can also be spaced in a lightly abutted relationship by the feeder of the present invention.

BRIEF DESCRIPTION OF THE DRAWINGS

FIG. 1 is a plan view of apparatus for automatically feeding a horizontal wrapping machine using the present invention.

FIG. 2 is an isometric view of a light contact feeder of the present invention.

FIGS. 3A, 3B illustrate transfer modules for transferring articles between a feeder of the present invention and a horizontal wrapping or other article processing machine.

FIG. 4 is a longitudinal section of the light contact feeder illustrating arrangements of motors and conveyor belts used in transporting articles along the feeder.

FIG. 5 illustrates a block diagram of circuitry for controlling operation of the light contact feeder of the present invention.

FIGS. 6–18 are flow charts which explain the operation of the control circuitry of FIG. 5.

FIGS. 19 and 20 illustrate electronic control circuitry which can be used in the block diagram of FIG. 5.

DESCRIPTION OF THE PREFERRED EMBODIMENT

An automatic wrapping system disclosed in FIG. 1 includes an article supplier conveyor 11 which supplies randomly spaced articles 12 to a feeder module 16 which adjusts the distance between the articles so the articles 12 are evenly spaced and delivered to a wrapping machine 17 at a speed equal to the speed of the receiving conveyor. A transfer conveyor 18 (FIGS. 1, 2, 3A, 3B) enables the articles 12 to be delivered to a receiving conveyor of the wrapping machine 17 (FIG. 3B) which is aligned with the feeder module 16, or to a wrapper receiving conveyor (FIG. 3A) which is at an oblique angle to the feeder module 16. A similar transfer conveyor (not shown) can be used to transfer articles to a wrapper conveyor at right angles to the feeder module. Several other types of transfer apparatus could be connected between the wrapper conveyor and the feeder module 16.

The feeder module 16 (FIGS. 1, 2, 4) includes an accumulator conveyor A and a metering conveyor M to continuously adjust gaps between the articles 12 as these articles are conveyed from the supply conveyor 11 in response to electronic circuitry mounted in a cabinet portion 16a of the module 16.

Each of the conveyors (FIGS. 1-4) includes a wide flat belt 22a, 22b mounted on a plurality of rollers 23 (FIG. 4) and which is accelerated by a drive roller 24 which is driven by a motor M1, M2 and a drive belt 28. Rotational position of each motor M1, M2 is monitored by an associated encoder E1, E2 and motor speed is monitored by a tachometer T1, T2 (FIGS. 4, 5). Each of the rollers 23 and drive rollers 24 is slightly crowned with a smaller diameter portion at each end so the belts 22a, 22b are automatically centered relative to the ends of the rollers. Because the articles need to be lightly abutted on the accumulator side guides are required to constrain the articles. This light pressure abutment minimizes damage to delicate articles. The rollers 23, 24 contact only the inside portions of the belts 22a, 22b so article residue on the conveyor belts does not accumulate on the rollers. Collection tubs can be placed on the floor under the conveyors to collect loose particles that fall from the belts. The belts can be easily removed for clean up or for belt replacement. An individual servo drive motor for each belt provides highly responsive independent control of each conveyor module. The presence or absence of articles 12 is detected by photocells 29 mounted above the conveyors M, A (FIGS. 2, 4, 5). Signals from the photoelectric cells 29 are coupled to a control circuit 30 (FIG. 5) which controls speed of the individual motors M1, M2 and their associated belt conveyors (FIGS. 4, 5) to control the spacing and timing of the articles 12.

The accumulator conveyor A is continuously velocity corrected to reposition articles 12 so the articles are lightly abutted. The metering conveyor M is continuously velocity corrected to time the abutted articles relative to the flights of the receiving conveyor 17 (FIG. 1) of the horizontal wrapper. This correction is such that after the individual articles are accelerated by transfer conveyor 18 (FIGS. 1, 2, 3A, 3B) to a velocity match with the wrapper receiving conveyor they will be properly timed with respect to its flights. Conveyor M corrects the phasing of the lead article of an abutted article slug relative to the wrapping machine.

The feeder control circuitry 30 (FIG. 5) includes a circuit module 34 for controlling operation of the accumulator belt 22a and metering altering belt 22b (FIGS. 1, 2, 4). The module 34 includes a master programmable logic controller or computer 35 for controlling operation of the motors M1, M2 in response to signals from the wrapping machine 17 and the photoelectric cells 29. One such master controller which can be used in the present invention is the Model ZT-8815 which is manufactured by Ziatech Corporation, San Luis Obispo, Calif. The master logic controller 35 provides control signals to and receive signals from a pair of axis motion controllers 36a, 36b which in turn receive rotational speed and position signals from the shaft encoders E1, E2. Motion controllers 36a, 36b each provide control signals to a servo motor controller 37a, 37b which supplies power for driving the corresponding servo motor M1, M2. One motion controller 36 which can be used in the present invention is the STD-16.03 which is manufactured by Amtek Digital Systems, Inc., Seattle, Wash. One servo motor controller 37 which can be used in the present invention is the pulse width modulated (PWM) type, Model GA4567P available from Glentek, El Segundo, Calif. A shaft encoder E which can be used in the present invention is the Model H25 manufactured by BEI Motion Systems Company of Golf, Calif.

Lead 41a communicates the wrapper machines status signals to logic controller 35 which also receives the lead 41b wrapper velocity and position reference signals from a master encoder E3 on a one-to-one shaft of wrapping machine 17. Logic controller 35 continuously processes these input signals and continuously sends output control signals to the motion controllers of the A and M conveyors and thereby synchronizes these conveyors with the operation of the wrapping machine 17. Logic controller 35 also continuously processes status input signals from all scanners 29 and continuously sends an output signal over lead 41 to automatically control a motor 40 to control the rate of wrapping machine 17 and thereby to automatically maintain the backlog of abutted articles 12 within preset limits. Lead 41c transmits a signal from logic controller 35 to a device for ejecting occasional out-of-phase articles which might occur under transient conditions such as emergency stops, rapid starts, etc. A blast of air from a jet 42 (FIGS. 1-3B) is used to eject out-of-phase articles from transfer conveyor 18.

The signal from the encoder E3 (FIG. 5) on the wrapping machine insures proper timing operation of the feeder 16 relative to operation of the wrapping machine, and signals from the encoders E1, E2 provide accurate measurement of movement of each of the conveyor belts. A pair of leads 43, 44 from the encoders E1, E2 and tachometers T1, T2 provide closed loop operation of computers 36a, 36b and motor controllers 37a, 37b to control conveyor belt accelerations and insure maximum performance without slippage problems. The encoders E1, E2 provide up to 1000 counts per revolution so they provide very accurate timing which is especially good for low wrapping rates on the feeder.

The control system (FIG. 5) of the present invention may be programmed to provide for feeding "groups" of articles into flighted or unflighted receiving conveyors of wrapping or other article processing machines. Paired article "groups" for example would be obtained by programming the logic controller 35 to control the metering conveyor velocity so multiple articles are transferred to the transfer module conveyor 18 per wrapping machine cycle. In this grouping application, the logic controller 35 would be programmed to meter and phase the paired article "groups" for properly timed transfer into the flighted or unflighted receiving conveyor wrapping machine.

Preset programs can be loaded into the computer 35 and selected by either a selector switch or by a communication link with a remote computer such as a personal computer so a human operator can easily select proper speed, package size and groupings. Since the feeder and wrapping machine are linked together the machines are appropriately synchronized. Since the wrapping machine supplies a timing signal from encoder E3 to the feeder no printed marks are required on conveyors or on wrappers to synchronize the two machines. The leading edges of articles 12 are sensed and phasing error software can be used to determine whether the individual conveyor belt should be speeded up or slowed down.

The feeder uses computer 35 to control the motion controllers 36 and the motor controllers 37 so that the velocity of the articles being transferred from the accumulator conveyor A to the metering conveyor M matches or slightly exceeds the speed of the metering conveyor to which they are transferred and thus minimizes article damage.

The feeder follows the wrapping machine. The feeder commands the wrapping machine to follow, within preset limits, the rate of supply of incoming articles to the upstream belt 22b. If the article supply rate increases the feeder and wrapper rates also increase, and if the article supply rate decreases the feeder and wrapper rates also decrease.

The feeder sends a rate control signal to the wrapping machine to command it to operate at the same rate as the article supply. If the articles seen by photocell 29d (FIGS. 2, 4) on the feeder are detected as being spaced together (abutted) the feeder will increase the rate signal to the wrapping machine by a preset amount until the spacing between the articles adjacent photocell 29c are no longer abutted. If the articles adjacent photocell 29b on the feeder are detected as being spaced apart the feeder will decrease the speed control signal to the wrapping machine by a preset amount until the articles are abutted.

The gap altering conveyors have two modes of operation:

(a) Following Mode.

During this mode of operation the accumulator conveyor belt follows the velocity of the metering conveyor belt. No corrections are made to the articles on the accumulator belt in this mode. The computer commands the following mode whenever scanners 29b and 29c detect abutted articles.

(b) Gap Closing Correct Mode.

The computer commands this mode whenever a gap has been detected between articles by the associated article detection scanner 29b or 29c. The accumulator conveyor belt 22a is then commanded to operate at a computer selected forward correction mode speed. The forward correction mode speed may optionally be determined by a computer algorithm. The algorithm determines the maximum speed from which the speeds can be accelerated to base feed speed (based upon packaging rate) at a preset deceleration during a movement of one-half the article length.

The accumulator conveyor will continue to operate at correction speed until the associated article detection scanner sees abutted articles. The conveyor belt will then decelerate to match the velocity or velocity ratio of the adjacent downstream metering conveyor belt and enter the "following mode".

The feeder monitors an encoder or some other type of position/velocity transducer mounted on the packaging machine. The transducer information is used in conjunction with article position detector associated with the metering conveyor M to determine the actual position error between the actual article position and the desired article position. A conveyor drive correction signal proportional to the measured error is implemented. This is accomplished by changing the velocity of the effected conveyor belt for a computer calculated machine or real time period. Accordingly, the computer serves as a means for adjusting the duration of the correction signal. This action corrects the article position and the actual position error becomes less than a preset value.

The feature of the present invention includes an automatic start-up mode which can be used only if the associated wrapping machine has an automatic start-up mode. When the wrapping machine is placed "on-line" in the automatic start mode the feeder is automatically armed. If articles are sitting on the feeder, as retained in the memory of computer 35, the feeder sends a start signal to the wrapping machine and triggers the following operation:

1. The wrapping machine will sound an alarm and after a suitable time delay start operating at a speed as commanded by the feeder.
2. The feeder will monitor the velocity/position sensor such as encoder E3 on the wrapping machine and follow this machine as the speed increases.
3. The article supply on the supply conveyor 11 will be monitored via the associated article detection scanner 29e. This information is used to set the running base velocity of the feeder and the wrapping machine.

If the articles are not sitting on the feeder as retained in computer memory, the feeder will operate as follows:

1. The feeder belts will be commanded to operate at a preset start up rate.
2. The supply conveyor product detection scanner 29e will monitor the incoming supply rate to determine when a usable supply of articles is available at a fairly constant rate. Articles not falling into this category will be rejected off the transfer conveyor.
3. When a "usable" supply of articles has been detected, the feeder will command the wrapping machine to start at such a real time that the feeder will put an article into the first desired flight of the receiving conveyor of the wrapping machine, thereby preventing the creation of an empty package.
4. The article supply rate from the supply conveyor 11 will be monitored via the associated product detection scanner 29e. This information is used to set the running base velocity of the feeder and the wrapping machine.
5. If the article supply rate disappears or otherwise becomes too sporadic for use, this will cause the feeder to do the following:
   1. The wrapping machine will be commanded to decelerate and stop.
   2. The feeder will revert back to the "on-line" in the automatic start mode. During this automatic start and stop, any articles out of phase will be automatically ejected off the transfer conveyor.

Programs for operating the wrapping machine and the feeder can be stored in the computers 35 and the desired program selected by a remote computer over a communications link or the programs could be selected by an optional selector switch on the feeder control cabinet.

The program data would include such parameters as product length and wrapper flight lengths.

The feeder has the capability of semi-automatically adjusting all article specific operational settings except the physical position of the product detection scanners. The setup procedure is as follows:

a. Set the setup mode selector switch to the "setup" position.
b. Place the associated wrapping machine in the "auto start" mode.
c. The feeder will now command the wrapping machine to start and run at a preselected speed. The wrapping machine will sound an alarm and then will start.
d. The feeder will monitor the velocity/position transducer such as an encoder mounted on the wrapping machine receiving conveyor or a packaging material feed mechanism. The feeder will determine velocity and acceleration rate of the wrapping machine. The velocity is used to identify the setting of the base velocity ratios for the metering belt M and the accumulator belt A. The acceleration measured is used to match start up and shut down parameters between the feeder and the wrapping machine.
e. The wrapping machine is commanded to stop.
f. The feeder commands all feeder belts to operate at 5" per second.
g. One article is manually placed on the accumulator belt. The article travels on each conveyor past the associated product detection scanner 29. The scanners are used to measure the length of the article.
h. After all conveyors have scanned the article the conveyors stop.
i. The length of the article measured is used to configure the following base velocity ratio gap and error sensing algorithm automatically for the new article. The length measured is also used to automatically limit the maximum range of the packing machine speed control command generated by the feeder computer. The longer the article, the lower the allowable packing machine speed range.
j. Set the mode selector switch to the "operate" position.
k. Stop the associated wrapping machine.

The flow charts of FIGS. 6-18 illustrate in more detail the sequence of feeder operation described above and can be used in programming the feeder computers.

An overview of the program for operating the feeder and wrapping machine is disclosed in FIG. 6, and FIGS. 7–18 each disclose detailed operation of a corresponding one of the blocks of FIG. 6. For example, the basic executive program which includes loading the program into the processor and checking the zero position of the encoder is disclosed in FIG. 7. The steps for automatic setup of the feeder are disclosed in FIG. 8.

Details of control circuit 30 (FIG. 5) are disclosed in FIGS. 19 and 20. The programmable logic controller 35 (FIG. 5) includes a master computer 35a and a plurality of input, output and display devices 48–53. A relay output card 48 which can be used in the pesent invention is the Model 7502 manufactured by Prolog Corporation, Monterey, Calif. An input card 49 which can be used is Model ADI-7911 made by Matrix Corporation, Raleigh, N.C. An analog output card 51 (FIG. 20) is Model STD-139 made by Micro Link, Carmel, Ind. A serial interface card 52 which can be used is Model ZT-8840 made by Ziatech Corporation, San Luis Obispo, Calif. A keyboard and display device 53 which can be used is Model Transterm 5 made by Computerwise Inc., Olathe, Kans.

The present invention is able to feed noncohesive articles, irregularly spaced articles, delicate articles, articles which tend to shingle and articles which tend to interleave, all of which have been difficult to feed to wrapping and other types of article processing machines. The present invention uses only two conveyors to provide proper timing between the articles on the feeder and the article position on the wrapper input conveyor.

Although the best mode contemplated for carrying out the present invention has been herein shown and described, it will be apparent that modification and variation may be made without departing from what is regarded to be the subject matter of the invention.

What is claimed is:

1. A light contact feeder for receiving randomly spaced articles from a supply conveyor, lightly abutting the articles and delivering a single article or a plurality of articles to an article processing machine, having an article processing machine flighted conveyor, at a spacing to match said flighted conveyor on said article processing machine, said feeder comprising:
    a master digital position encoding means coupled to said article processing machine for providing information relating to position and velocity of said flighted conveyor on said article processing machine;
    an article metering conveyor for delivering said articles to said processing machine;
    a metering motor means coupled to said master encoding means and to said metering conveyor for operating said metering conveyor at a predetermined position and velocity relative to said flighted conveyor of said article processing machine;
    an accumulator conveyor for delivering said articles to said article metering conveyor; and
    means responsive to the relative spacing of articles on said accumulator conveyor for automatically varying the speed of said accumulator conveyor so as to maintain said articles in substantially end-to-end abutting relationship on said metering conveyor while substantially minimizing excessive contact pressure between said articles.

2. A light contact feeder as defined in claim 1 including metering conveyor encoding means coupled to said motor means for providing information relating to position and velocity of said metering conveyor, and logic means connected to said master encoding position means and to said metering conveyor encoding means for providing a control signal to said motor means for causing said metering motor means to follow a movement of said master encoding position means at a preset ratio and within a predetermined following error.

3. A light contact feeder as defined in claim 2 including a first scanner disposed to provide an article detect signal when an article moves to a position adjacent an exit portion of said metering conveyor, logic means for combining said article detect signal with a signal from said master position encoding means and to provide a speed correction signal to said metering motor when said article detect signal and said master position signal have a predetermined difference in phase.

4. A light contact feeder as defined in claim 3 including means for adjusting the amount of difference in phase between said article detect signal and said master position signal which causes a speed correction signal to be developed, and means for adjusting the duration of said speed correction signal.

5. A light contact feeder as defined in claim 4 including operation input means for defining the length of articles and flight length of said flighted conveyor of said article processing machine and logic means for using said defined article length and flight length of determining the value of a preset ratio of metering belt velocity relative to a velocity of said article processing machine flighted conveyor and said predetermined phase difference which causes said speed correction signal to be developed.

6. A light contact feeder as defined in claim 4 including a plurality of scanners adjacent said metering conveyor, control logic means for causing said article processing machine to operate at a preset speed and causing said metering conveyor to operate at a predetermined speed when said feeder is placed in an automatic setup mode, said control logic means using signals from said scanners and from said metering conveyor encoder to determine article length.

7. A feeder accumulating means for receiving randomly spaced articles from a supply conveyor and for delivering lightly abutted articles to an article processing maching having an article processing machine flighted conveyor at a speed ratio and at a phase relative to a flighted conveyor on said article processing machine, said feeder accumulating means comprising:
    an accumulator conveyor;
    an accumulator motor coupled to said accumulating conveyor for operating said conveyor;
    an accumulator encoder coupled to said accumulator motor to generate position and velocity signals indicative of the movement of said accumulator conveyor;
    a first accumulator scanner disposed to provide a first nonabutted signal when nonabutted articles move to a position adjacent an exit portion of said accumulator conveyor;
    a metering conveyor positioned adjacent said exit portion of said accumulator conveyor;
    a metering encoder coupled to said metering conveyor to develop a metering speed signal indicative of the speed of said metering conveyor; and
    logic means for using said first nonabutted signal and said metering speed signal to control the speed of said accumulator motor so said accumulator conveyor operates at the speed of said metering conveyor plus a first predetermined value when said first accumulator scanner detects abutted articles, and said accumulator conveyor operates at the speed of said metering conveyor plus a second predetermined value when said first accumulator scanner detects nonabutted articles.

8. A feeder accumulating means as defined in claim 7 including:

a second accumulator scanner mounted upstream of said first accumulator scanner for providing a second nonabutting signal when nonabutting articles move adjacent said second accumulator scanner; and accumulator logic means for causing said accumulator conveyor to operate at the same speed as said metering conveyor when both said first and said second accumulator scanners detect abutted articles, said accumulator logic means causing said accumulator conveyor to operate at the speed of said metering conveyor plus a first predetermined value when said first accumulator scanner detects abutted articles and said second accumulator scanner detects nonabutted articles, said accumulator logic means causing said accumulator conveyor to operate at the speed of said metering conveyor plus a second predetermined value when said first accumulator scanner detects nonabutted articles.

9. A feeder accumulating means as defined in claim 8 including:

a third accumulator scanner mounted upstream of said second accumulator scanner for providing a third nonabutting signal when nonabutting articles move adjacent said third accumulator scanner;

a supply conveyor scanner mounted adjacent said supply conveyor to provide an article detect signal when an article moves adjacent said supply conveyor scanner;

a supply logic means for using said article detect signal to determine a desired article processing machine rate;

a comparison logic means for monitoring said first, second and third accumulator scanners to detect abutted articles, said comparison logic decreasing said desired article processing machine rate by a third predetermined value to a first trimmed article processing rate when said first accumulator scanner detects nonabutted articles for a preset duration, said comparison logic increasing said desired article processing machine rate by a fourth predetermined value to a second trimmed article processing rate when said first, second and third accumulator scanners detect abutted articles for a preset duration; and means for coupling said comparison logic to said article processing machine to cause said article processing machine to operate at a rate determined by the rate of articles entering said accumulator conveyor modified by a value proportional to the amount of abutted articles on said accumulator conveyor.

10. A feeder accumulating means as defined in claim 9 including an article processing machine encoder for developing a processing signal proportional to the operating rate of said article processing machine, said comparison logic means comparing said operating rate of said processing machine with said one of said first and said second trimmed article processing rates being developed at the time, to generate a velocity error signal, and means for using said velocity error signal to control the speed of said article processing machine.

11. A feeder accumulating means as defined in claim 10 including start logic means for using said second and said third accumulator scanners and said supply conveyor scanner to develop start/stop commands to said article processing machine, said start logic means providing a start signal when articles arrive at said supply conveyor scanner at a predetermined rate and when abutted articles are detected by said second and said third accumulator scanner, said start logic means stopping said article processing machine when articles are no longer detected at said supply conveyor scanner and articles are no longer detected at said first accumulator scanner.

12. The light contact feeder as defined in claim 1 wherein said means responsive to the relative spacing of articles further acts to avoid relative movement between said articles and said accumulator conveyor.

* * * * *